(12) United States Patent
Matsuura (10) Patent No.: US 10,607,360 B2
(45) Date of Patent: Mar. 31, 2020

(54) IMAGE PROCESSING APPARATUS AND NON-TRANSITORY COMPUTER-READABLE STORAGE MEDIUM

(71) Applicant: MITUTOYO CORPORATION, Kanagawa (JP)

(72) Inventor: Shinpei Matsuura, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 27 days.

(21) Appl. No.: 16/116,159

(22) Filed: Aug. 29, 2018

(65) Prior Publication Data

US 2019/0073784 A1 Mar. 7, 2019

(30) Foreign Application Priority Data

Sep. 4, 2017 (JP) ................................. 2017-169846

(51) Int. Cl.
*G06T 7/60* (2017.01)
*G06T 7/521* (2017.01)
*G06T 5/00* (2006.01)
*G06T 5/10* (2006.01)

(52) U.S. Cl.
CPC ............. *G06T 7/60* (2013.01); *G06T 5/002* (2013.01); *G06T 5/10* (2013.01); *G06T 7/521* (2017.01); *G06T 2207/20064* (2013.01)

(58) Field of Classification Search
CPC ....... G06T 15/506; G06T 15/50; G06T 17/00; G06T 2207/10028; G06T 2207/10152; G06T 5/002; G06T 2200/04; G06T 15/83; G06T 7/50; G06T 7/136; G06T 7/344; H04N 5/2256; H04N 5/2354; H04N 1/6086

See application file for complete search history.

(56) References Cited

U.S. PATENT DOCUMENTS

2017/0164836 A1\* 6/2017 Krishnaswamy .... A61B 5/0075

OTHER PUBLICATIONS

Karaçali B, Snyder W. Noise reduction in surface reconstruction from a given gradient field. International Journal of Computer Vision. Oct. 1, 2004;60(1):25-44. (Year: 2004).\*

(Continued)

*Primary Examiner* — Clifford Hilaire
(74) *Attorney, Agent, or Firm* — Greenblum & Bernstein, P.L.C.

(57) ABSTRACT

An image processing apparatus includes an image acquisition part that acquires a plurality of measured images by capturing an object to be measured; a modeling part that identifies a modeled parameter based on the measured images; an intermediate image generation part that generates an intermediate image for generating a geometry image indicating a geometry of the object to be measured based on the modeled parameter; a noise threshold image generation part that generates a noise threshold image by identifying a noise threshold value of each pixel in the intermediate image using statistics indicating an error between the pixel values of pixels included in the data sequence and approximation values of pixels identified based on the modeled parameter for each pixel; and a noise removing part that performs thresholding on the intermediate image using the noise threshold image.

8 Claims, 9 Drawing Sheets

(56) References Cited

OTHER PUBLICATIONS

Rosman G, Rus D, Fisher JW. Information-driven adaptive structured-light scanners. InProceedings of the IEEE Conference on Computer Vision and Pattern Recognition 2016 (pp. 874-883). (Year: 2016).*
Silvio Montresor et al., "Quantitative appraisal for noise reduction in digital holographic phase imaging", Optics Express, Jun. 16, 2016, pp. vol. 24, No. 13.
D.L. Donoho et al., "De-Noising by Soft-Thresholding", IEEE Trans, on Inf Theory, 1995, pp. 613-927, vol. 41. No. 3.
U.S. Appl. No. 16/116,089 to Shinpei Matsuura, filed Aug. 29, 2018.

\* cited by examiner

(1) Acquire measured images and identify modeled parameters (2) Generate intermediate image (3) Generate noise threshold value image (4) Perform thresholding on intermediate image using noise threshold value (5) Generate geometry image using intermediate image

IMAGE PROCESSING APPARATUS AND NON-TRANSITORY COMPUTER-READABLE STORAGE MEDIUM

CROSS-REFERENCE TO RELATED APPLICATIONS

The present application claims priority to the Japanese Patent Application number 2017-169846, filed on Sep. 4, 2017. The content of this application is incorporated herein by reference in their entirety.

TECHNICAL FIELD

The present invention relates to an image processing apparatus and a storage medium for measuring a geometry of an object to be measured.

BACKGROUND OF THE INVENTION

A non-contact three-dimensional (3D) geometry measuring instrument that performs 3D measuring of an object to be measured by using a plurality of measured images is known.

The non-contact 3D geometry measuring instrument generates an intermediate image to measure a geometry of the object to be measured by using the measured images. Since various types of noise are included in the measured images, similar noise is also included in the intermediate image.

Non-Patent Document, S. Montresor, et al., "Optics Express," Vol. 24, Issue 13, pp. 14322-14343, 2016, discloses a technique that removes noise of an intermediate image using various filters. However, in the technique disclosed in the above-mentioned Document, there was a problem that an area where noise is not sufficiently removed remained in the intermediate image.

BRIEF SUMMARY OF THE INVENTION

This invention focuses on this point, and an object of the invention is to provide a technique that reduces noise included in the intermediate image.

An image processing apparatus according to the first aspect of the present invention includes: an image acquisition part that acquires a plurality of measured images by capturing an object to be measured; a modeling part that identifies, for each pixel of the measured images, a modeled parameter of an approximation function approximating a data sequence where pixel values of pixels corresponding to the measured images are placed according to a predetermined order; an intermediate image generation part that generates an intermediate image for generating a geometry image indicating a geometry of the object to be measured based on the modeled parameter; a noise threshold image generation part that generates a noise threshold image by identifying a noise threshold value of each pixel in the intermediate image using statistics indicating an error between the pixel values of pixels included in the data sequence and approximation values of pixels identified based on the modeled parameter for each pixel; and a noise removing part that performs thresholding on the intermediate image using the noise threshold image.

A storage medium according to the second aspect of the present invention is a non-transitory computer-readable storage medium and stores a program that makes a computer perform functions of: acquiring a plurality of measured images by capturing an object to be measured; identifying, for each pixel of the measured images, a modeled parameter of an approximation function approximating a data sequence where pixel values of pixels corresponding to the measured images are placed according to a predetermined order; generating an intermediate image for generating a geometry image indicating a geometry of the object to be measured based on the modeled parameter; generating a noise threshold image by identifying a noise threshold value of each pixel in the intermediate image using statistics indicating an error between the pixel values of pixels included in the data sequence and approximation values of pixels identified based on the modeled parameter for each pixel; and performing thresholding on the intermediate image using the noise threshold image.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

Embodiment

Figure 1:
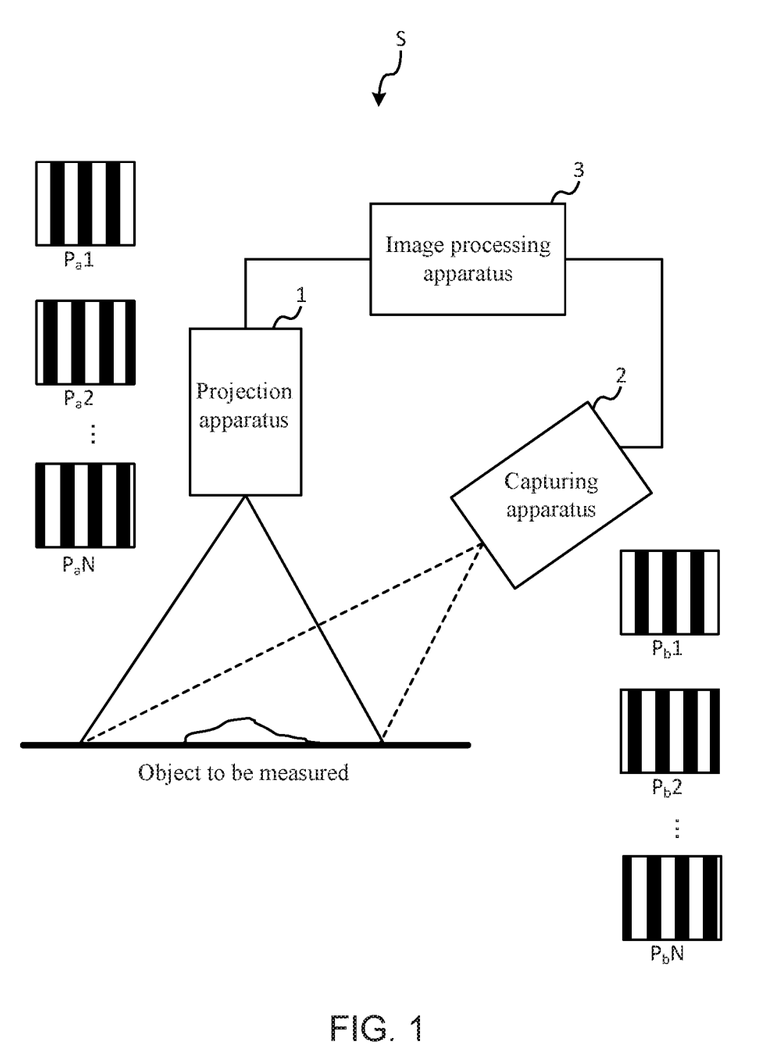
FIG. 1 illustrates the outline of an image processing system according to the embodiment.

The outline of an image processing system S according to the embodiment will be explained by referring to FIG. 1. FIG. 1 illustrates the outline of an image processing system S according to the embodiment. The image processing system according to the embodiment is an image processing system for measuring a geometry of an object to be measured by capturing the object to be measured onto which a projection image is projected.

The image processing system S includes a projection apparatus 1, a capturing apparatus 2, and an image processing apparatus 3. The image processing apparatus 3 is connected to the projection apparatus 1 and to the capturing apparatus 2 in a manner enabling communication. The projection apparatus 1 is a liquid crystal projector, for example. The projection apparatus 1 projects light with a plurality of different projection patterns ($P_a1, P_a2, \ldots, P_aN$) onto the object to be measured. The projection apparatus 1 sequentially projects, for example, light with sinusoidal patterns a plurality of times while changing the phase of the sinusoidal patterns.

The capturing apparatus 2 is, for example, a digital camera having an imaging element of two million pixels. The capturing apparatus 2 generates a plurality of different measured images ($P_b1$, $P_b2$, ..., $P_bN$) by sequentially capturing the object to be measured onto which light with the plurality of different projection patterns ($P_a1$, $P_a2$, ..., $P_aN$) is projected. The capturing apparatus 2 transmits the captured measured images to the image processing apparatus 3.

The image processing apparatus 3 is a computer, for example. The image processing apparatus 3 acquires the measured images by controlling the projection apparatus 1 to sequentially project light with the plurality of projection patterns and controlling the capturing apparatus 2 to generate the measured images in a sequential manner by capturing the object to be measured onto which the projection image is projected. The image processing apparatus 3 generates an intermediate image to identify a geometry of the object to be measured by using the acquired measured images. The image processing apparatus 3 reduces noise included in the intermediate image by performing image processing on the intermediate image.

Figure 2:
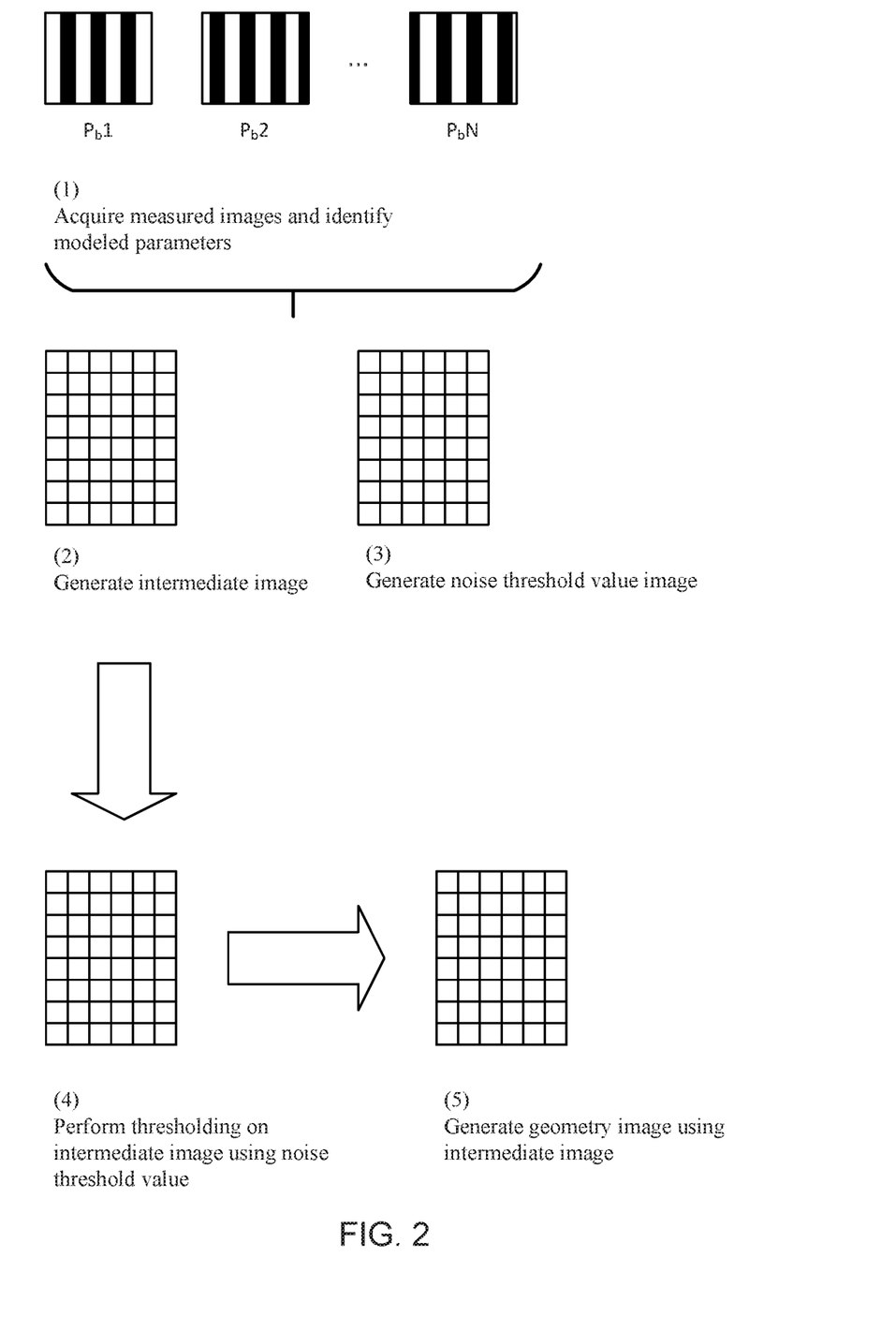
FIG. 2 illustrates the outline of processing for reducing noise.

By referring to FIG. 2, the outline of processing for reducing noise of the intermediate image that the image processing apparatus 3 performs will be explained. FIG. 2 illustrates the outline of processing for reducing noise.

First, the image processing apparatus 3 acquires a plurality of measured images. The image processing apparatus 3 identifies a modeled parameter of an approximation function approximating pixel values of each pixel of the acquired measured images ((1) of FIG. 2). Hereafter, modeled parameters of approximation functions approximating pixel values of pixels of the acquired measured images may be called "modeled parameters for the measured image". The image processing apparatus 3 generates an intermediate image, which is a reconstructed image generated by reconstructing the measured image using the modeled parameter ((2) of FIG. 2) and generates a noise threshold image that is a group of data in which pixels and the noise threshold values are associated with each other ((3) of FIG. 3). It should be noted that details for deriving a modeled parameter will be described later.

The image processing apparatus 3 performs thresholding on the intermediate image using the noise threshold image ((4) of FIG. 2). The thresholding is a process for changing the pixel values of the intermediate image on the basis of a result of comparing the pixel values of the intermediate image and the threshold values corresponding to the pixels of the intermediate image. The image processing apparatus 3 generates a geometry image using the intermediate image for which the thresholding was performed ((5) of FIG. 2). In this way, the image processing apparatus 3 is capable of reducing the noise included in the intermediate image. Then, the image processing apparatus 3 generates the geometry image indicating the geometry of the object to be measured using the intermediate image in which the noise is reduced. In this way, the image processing apparatus 3 is capable of improving measurement accuracy of the geometry of the object to be measured.

<Configurations of the Image Processing Apparatus According to the Embodiment>

Figure 3:
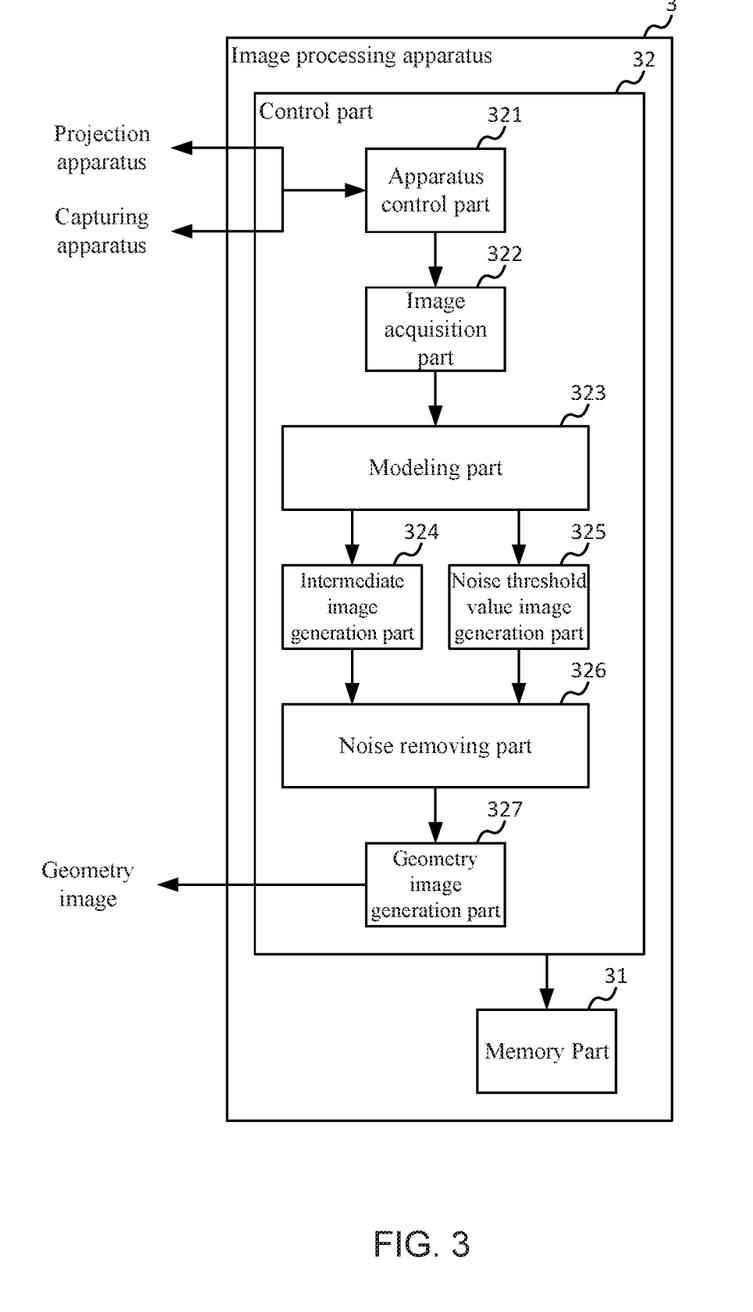
FIG. 3 shows a functional configuration of an image processing apparatus according to the embodiment.

A functional configuration of the image processing apparatus 3 according to the embodiment will be described by referring to FIG. 3. FIG. 3 shows the functional configuration of the processing apparatus 3 according to the embodiment. The image processing apparatus 3 according to the embodiment includes a memory part 31 and a control part 32.

The memory part 31 includes a memory medium including a read only memory (ROM), a random access memory (RAM), and the like. The memory part 31 stores the measured images, the modeled parameters, the intermediate images, or the corrected measured images. Also, the memory part 31 is a non-transitory computer-readable storage medium and stores programs to be executed by the control part 32. The memory part 31 may include a storage medium such as a CD-ROM which stores a program.

The control part 32 is a calculating resource including processors such as a central processing unit (CPU), not shown. By executing the programs stored in the memory part 31, the control part 32 realizes functions of an apparatus control part 321, an image acquisition part 322, a modeling part 323, an intermediate image generation part 324, a noise threshold image generating part 325, a noise removing part 326, and a geometry image generation part 327. The apparatus control part 321 controls the projection apparatus 1 and the capturing apparatus 2 by transmitting instruction information.

The apparatus control part 321 controls the projection apparatus 1 so as to project the projection light onto the object to be measured. Specifically, the apparatus control part 321 controls the projection apparatus 1 so as to sequentially project, onto the object to be measured, light with a plurality of projection patterns whose luminance changes according to the phases determined by coordinates of a projection image and whose relationship between the phase and the coordinate is different from each other. The apparatus control part 321 controls the projection apparatus 1 so as to sequentially project, for example, the light with projection patterns generated by the projection image having sinusoidal patterns while changing the phases of the sinusoidal patterns. The phase differences between sequentially projected projection patterns are, for example, constant.

The apparatus control part 321 may control the projection apparatus 1 so as to project N projection images onto the object to be measured in a sequential manner by changing the phases of the sinusoidal patterns N times. For example, when changing the phases of sinusoidal patterns N times, the apparatus control part 321 controls the projection apparatus 1 so as to change the phases of sinusoidal patterns by $\delta_i = 2\pi i/N (i=1, 2, \ldots, N)$. When projecting the sinusoidal patterns, the apparatus control part 321 performs control so as to project the projection image having the sinusoidal patterns that corresponds to $I(x, y) = I_0 \sin(2\pi x T/M_x + \delta_i)$ onto the object to be measured, where $I(x, y)$ denotes light intensity at the coordinates (x, y) of the projection image. It should be noted that $M_x$ denotes the number of pixels in the x direction of the projection image, and T denotes the number of sinusoidal patterns included in the projection image.

The apparatus control part 321 controls the capturing apparatus 2 so as to generate the measured image by capturing the object to be measured onto which the projection light is projected. Specifically, the apparatus control part 321 controls the capturing apparatus 2 so as to generate a plurality of different measured images by sequentially capturing the object to be measured onto which light with a plurality of projection patterns is respectively projected. The apparatus control part 321 controls the capturing apparatus 2 so as to transmit the plurality of different measured images to the image acquisition part 322. The apparatus control part

321 may control the capturing apparatus 2 so as to transmit, to the image acquisition part 322, the different measured images, to which identifiers identifying the capturing order of the measured images are added.

The image acquisition part 322 acquires a plurality of measured images acquired by capturing the object to be measured in each of a plurality of predetermined conditions. "The plurality of conditions" are, for example, the type of projection patterns projected onto the object to be measured, an order of capturing the object to be measured onto which the projection patterns are projected, a wavelength of light to be projected, and an optical system emitting light. The image acquisition part 322 gives the different measured images being acquired to the modeling part 323. The image acquisition part 322 acquires, for examples, a plurality of measured images obtained by capturing the object to be measured in a plurality of states where the light with the plurality of projection patterns having different phases are projected onto the object to be measured.

The modeling part 323 identifies, for each pixel of the measured image, a modeled parameter of the approximation function approximating the data sequence, in which the pixel values of the pixels corresponding to the measured images are placed according to the order determined in accordance with the conditions. The modeled parameters are parameters of the approximation function approximating the data sequence, in which the pixel values of the pixels corresponding to the measured images are placed in the order of the capturing. It should be noted that the explanation below is given on the assumption that the data sequence is placed in the order of capturing, but the data sequence may be placed in accordance with other conditions.

Figure 4A:
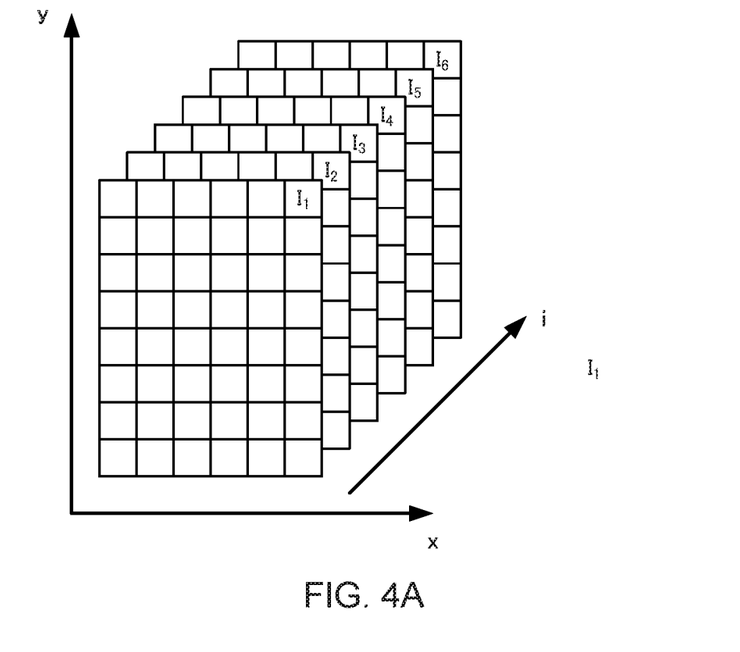
FIGS. 4A and 4B each illustrate an approximation function approximating a data sequence.
Figure 4B:
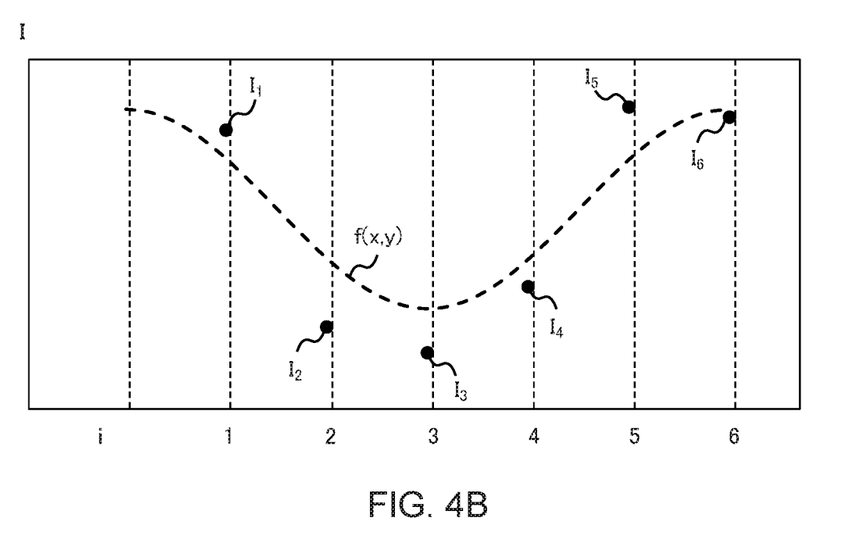

A method of the modeling part 323 identifying the modeled parameter of the approximation function approximating a data sequence will be described by referring to FIGS. 4A and 4B. FIGS. 4A and 4B each illustrate an approximation function approximating a data sequence. FIG. 4A is a schematic diagram showing the measured images placed in the order of capturing. In FIG. 4A, the horizontal axis and the vertical axis respectively indicate the x-coordinate and the y-coordinate of the measured image. The explanation below is given on the assumption that the image acquisition part 322 captured six measured images ($P_b1$, $P_b2$, $P_b3$, $P_b4$, $P_b5$, and $P_b6$). $I_i$ in FIG. 4A indicates the pixel value of the pixel determined by the x coordinate and the y coordinate of the i-th measured image.

FIG. 4B is a schematic diagram in which the data sequences, where the pixel values $I_i$ of the pixels determined by the coordinates (x, y) are placed in the order of capturing, are plotted. In FIG. 4A, the horizontal axis indicates the capturing order of the measured images, and the vertical axis indicates the pixel value of the pixel. The pixel value $I_i(x, y)$ of pixels determined based on the coordinates (x, y) of the i-th sheet of measured image are plotted with black circles. The function f(x, y) indicated in the broken line is the approximation function approximating the plotted data sequence.

Each piece of data of the plotted data sequence includes an error at the time of measuring. Therefore, each piece of data and the approximate value, which is approximately identified based on the approximation function corresponding the data sequence, do not necessarily coincide with each other. The approximation function can be fit to the plotted data sequence by identifying the modeled parameter in which the sum of squares of an error $\varepsilon_i(x, y)$ becomes minimum, where a difference between measured data and the approximation value is set to the error at the time of measuring $\varepsilon_i(x, y)$.

Figure 5:
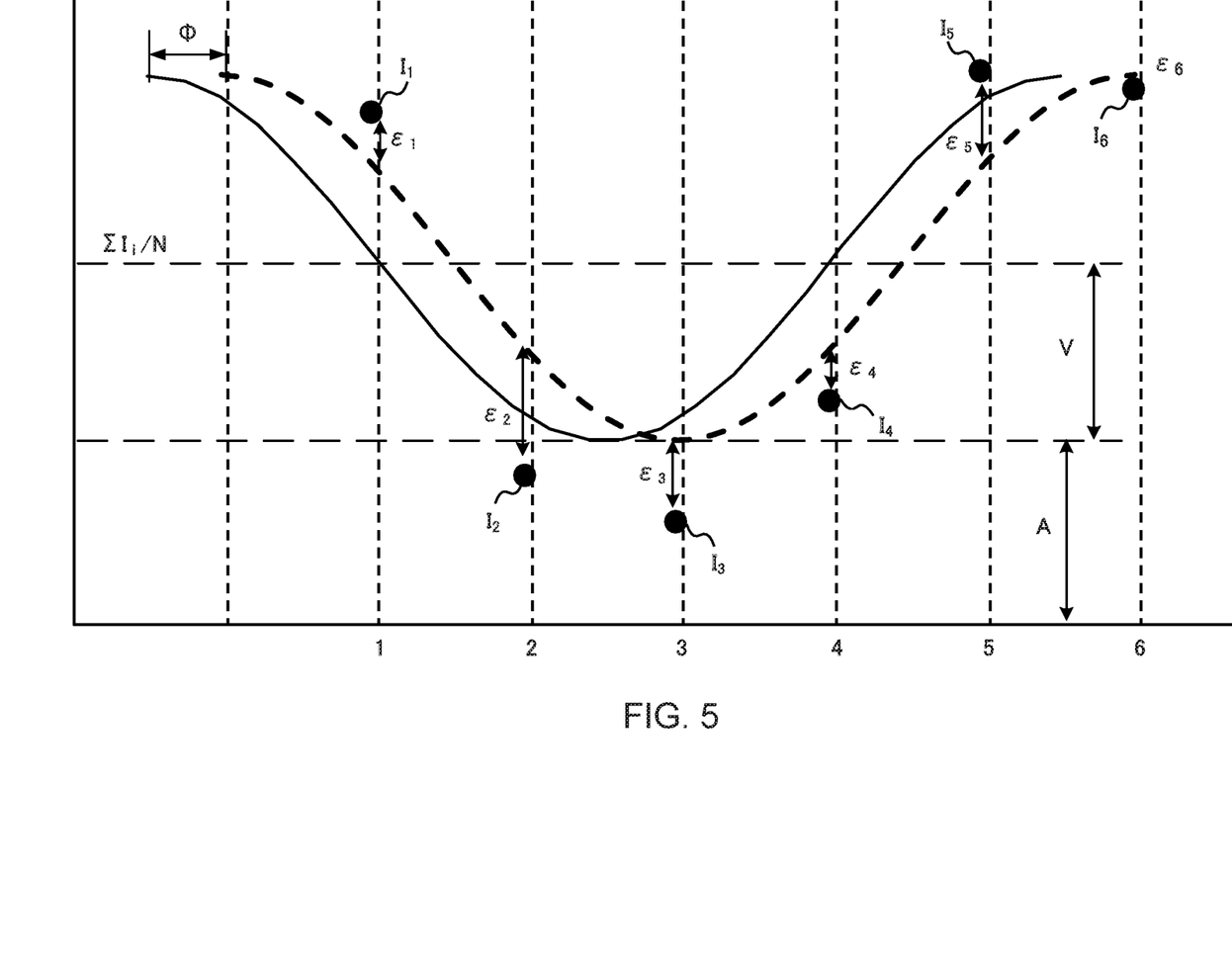
FIG. 5 illustrates processing for identifying a modeled parameter of the approximation function approximating a data sequence.

Processing for identifying a modeled parameter by the modeling part 323 will be described by referring to FIG. 5. FIG. 5 illustrates the process for identifying the modeled parameter of an approximation function approximating a data sequence. Similar to FIG. 4B, FIG. 5 is a schematic diagram in which the data sequences where the pixel values of the pixels are placed in the order of capturing are plotted. In FIG. 5, the function f indicated by the solid line is a reference approximation function. An amplitude V indicates an amplitude of the approximation function, a bias I'(x, y) indicates the center of the amplitude V, and an offset A indicates an offset of the approximation function. The function f(x, y) indicated by the broken line is the approximation function of the data sequence where the pixel values of the pixels of the coordinates (x, y) corresponding to the respective measured images are placed in the order of capturing and deviates from the reference approximation function by the phase φ, the amplitude ΔV, and the offset ΔA. Also, errors $\varepsilon_i$(i=1 to 6) respectively indicate a distance from each piece of data to the approximation value corresponding to each piece of data.

Therefore, the approximation value corresponding to each piece of data is represented by Equation (1) below.

$$I_i(x,y)=I'(x,y)+I'(x,y,A)\cos\,[\phi(x,y)+k(x,y)(\delta_i)]+\varepsilon_i(x,y) \quad (1)$$

Here, the phase φ(x, y) is a variable indicating the phase shift of the approximation function of the data sequence where the pixel values of the pixels at the coordinates (x, y) are arranged, and is also a variable associated with a height of the object to be measured. In Equation (1), I'(x, y) denotes a bias I'(x, y), and V(x, y) denotes the amplitude of the approximation function. $\delta_i$ denotes the phase of the i-th measured image. $\delta_i$ is, as shown above, $\delta_i = 2\pi i/N$ (i=1, 2, . . . , N), and N=6 in the present embodiment. The phase k(x, y) is a variable associated with the phase of the sinusoidal patterns included in the projection pattern. In the explanation below, a sum of the phase φ(x, y) and the phase k(x, y) may be referred to as a phase value. Also, $\varepsilon_i(x, y)$ is an error. Equation (1) is transformed to be represented by Equation (2).

$$I_i(x,y)=I'(x,y)+\varepsilon_i(x,y)$$
$$+I'(x,y)\cos\,[\phi(x,y)+k(x,y)]\cos(\delta_i)$$
$$-I'(x,y)\sin\,[\phi(x,y)+k(x,y)]\sin(\delta_i) \quad (2)$$

Here, each item of Equation (2) is replaced as shown in Equations (3) to (5).

$$a_0(x,y)=I'(x,y) \quad (3)$$

$$a_1(x,y)=V(x,y)\cos\,[\phi(x,y)+k(x,y)] \quad (4)$$

$$a_2(x,y)=-V(x,y)\sin\,[\phi(x,y)+k(x,y)] \quad (5)$$

Equation (2) is represented by Equation (6) using Equations (3) to (5).

$$I_i(x,y)=a_0(x,y)+a_1(x,y)\cos(\delta_i)+a_2(x,y)\sin(\delta_i) \quad (6)$$

The pixel value of the coordinates (x, y) is represented by Equation (7) by expressing Equation (6) for the respective measured images.

$$I_1(x, y) = a_o(x, y) + a_1(x, y)\cos(\delta_1) + a_2(x, y)\sin(\delta_1) \quad (7)$$
$$I_2(x, y) = a_o(x, y) + a_1(x, y)\cos(\delta_2) + a_2(x, y)\sin(\delta_2)$$
$$\vdots$$
$$I_N(x, y) = a_o(x, y) + a_1(x, y)\cos(\delta_N) + a_2(x, y)\sin(\delta_N)$$

$$\begin{bmatrix} I_1 \\ I_2 \\ \vdots \\ I_N \end{bmatrix} = \begin{bmatrix} 1 & \cos(\delta_1) & \sin(\delta_1) \\ 1 & \cos(\delta_1) & \sin(\delta_2) \\ \vdots & \vdots & \vdots \\ 1 & \cos(\delta_N) & \sin(\delta_N) \end{bmatrix} \begin{bmatrix} a_o \\ a_1 \\ a_2 \end{bmatrix} \quad (8)$$

Suppose that Equation (8) is I=Xa. In such a case, the vector 'a', which is optimal with regard to minimizing 2-norm of I-Xa, is known as a solution of the least-squares method, and can be expressed as $a=(X^TX)^{-1}X^TI$. Therefore, $X^TX$ is represented by Equation (9). Also, $X^TI$ is represented by Equation (10). In the following equation, unless otherwise specified, $\Sigma$ without any subscription is the total sum of i=1 to N.

$$X^TX = \begin{bmatrix} N & \sum \cos(\delta_i) & \sum \sin(\delta_i) \\ \sum \cos(\delta_i) & \sum \cos^2(\delta_i) & \sum \cos(\delta_i)\sin(\delta_i) \\ \sum \sin(\delta_i) & \sum \cos(\delta_i)\sin(\delta_i) & \sum \sin^2(\delta_i) \end{bmatrix} \quad (9)$$

$$X^TI(x, y, \delta_i) = \begin{bmatrix} \sum I_i \\ \sum I_i\cos(\delta_i) \\ \sum I_i\sin(\delta_i) \end{bmatrix} \quad (10)$$

When $\delta_i=2\pi i/N$ (i=1, 2, ..., N), the non-diagonal matrix in Equation (9) is zero, thus the vector 'a' is represented by Equation (11).

$$\begin{bmatrix} a_0 \\ a_1 \\ a_2 \end{bmatrix} = \begin{bmatrix} N & 0 & 0 \\ 0 & N/2 & 0 \\ 0 & 0 & N/2 \end{bmatrix}^{-1} \begin{bmatrix} \sum I_i \\ \sum I_i\cos(\delta_i) \\ \sum I_i\sin(\delta_i) \end{bmatrix} \quad (11)$$

Thus, $a_0$, $a_1$, and $a_2$ are respectively represented by Equations (12), (13), and (14).

$$a_0 = \frac{1}{N}\sum I_i \quad (12)$$

$$a_1 = \frac{2}{N}\sum I_i\cos(\delta_i) \quad (13)$$

$$a_2 = \frac{2}{N}\sum I_i\sin(\delta_i) \quad (14)$$

Using Equations (12) to (14), the modeling part 323 identifies the phase value of the pixel (the sum of the phase $\varphi(x, y)$ and the phase $k(x, y)$), the amplitude V of the approximation function, and the offset A, which are the modeled parameters. The pixel value of the image is represented by Equation (15), the amplitude V of the approximation function is represented by Equation (16), and the offset A is represented by Equation (17). The modeling part 323 gives the identified modeled parameters to the intermediate image generation part 324 and to the noise threshold image generation part 325.

$$\phi(x, y) + k(x, y) = \arctan\left(\frac{-\sum_{i=1}^{N} I_i\sin(\delta_i)}{\sum_{i=1}^{N} I_i\cos(\delta_i)}\right) \quad (15)$$

$$V(x, y) = \frac{2}{N}\sqrt{\left[\sum_i I_i\cos(\delta_i)\right]^2 + \left[\sum_i I_i\sin(\delta_i)\right]^2} \quad (16)$$

$$A(x, y) = \frac{1}{N}\sum_{i=1}^{N} I_i - V \quad (17)$$

The intermediate image generation part 324 generates the intermediate image to generate the geometry image indicating the geometry of the object to be measured based on the modeled parameters. For example, the intermediate image generation part 324 generates an intermediate image which is an image encoded so that geometry information of the object to be measured corresponds to the phases determined according to the conditions. Specifically, the intermediate image generation part 324 generates an intermediate image encoded so that each pixel value of the measured image is equal to a value that corresponds to a phase value ($\Phi(x, y)+k(x, y)$) included in a modeled parameter. The intermediate image generation part 324 gives the generated intermediate image to the noise removing part 326.

The noise threshold image generation part 325 generates the noise threshold image that is a group of data indicating a noise threshold value of each pixel in the intermediate image. For example, noise threshold image generation part 325 generates a noise threshold image by identifying a noise threshold value of each pixel in the intermediate image using statistics indicating an error between pixel values of a plurality of pixels included in a data sequence and an approximation value of each pixel identified based on the modeled parameter for each pixel. For example, the noise threshold image generation part 325 generates a noise threshold image using a standard deviation which is a difference between the pixel values of the plurality of pixels included in the data sequence and the approximation value of each pixel. Specifically, the noise threshold image generation part 325 generates a plurality of noise threshold images corresponding to the respective plurality of pixels by using the standard deviation of a phase error determined by laws of propagation of errors. Hereafter, methods of the noise threshold image generation part 325 for identifying the noise threshold value and generating the noise threshold image will be explained.

The noise threshold image generation part 325 first identifies an estimated error amount $\varepsilon_i'(x, y)$ which is a difference between a pixel value $I_i(x, y)$ of each pixel of the respective measured images and a pixel value $I_i^R(x, y)$ of each pixel of the intermediate images corresponding to the respective measured images. The identified estimated error amount $\varepsilon_i'(x, y)$ is represented by Equation (18).

$$\varepsilon_i'(x,y) = I_i(x,y) - I_i^R(x,y) \quad (18)$$

Using Equation (18), the noise threshold image generation part 325 identifies a standard deviation $\sigma(x, y)$ of the estimated error amount. The standard deviation $\sigma(x, y)$ is represented by Equation (19).

$$\sigma(x, y) = \sqrt{\frac{1}{N-1}\sum_{i=1}^{N} \varepsilon_i'(x, y)} \quad (19)$$

Using Equation (19) and the known laws of propagation of errors, the noise threshold image generation part 325 identifies an estimated error $\sigma_\varphi$ of a variation amount. The estimated error $\sigma_\varphi$ is represented by Equation (20).

$$\sigma_\varphi = \frac{\sin\delta_i\left(\sum I_i(x, y)\cos\delta_i\right) - \cos\delta_i\left(\sum I_i(x, y)\sin\delta_i\right)}{\{\sum I_i(x, y)\cos\delta_i\}^2 + \{\sum I_i(x, y)\sin\delta_i\}^2}\sigma \quad (20)$$

The noise threshold image generation part 325 generates the noise threshold image using the estimated error $\sigma_\varphi$ of the variation amount identified in Equation (20). The noise threshold image generation part 325 identifies the noise threshold value of each pixel of the intermediate image using the known algorithm proposed by D. Donoho (D. L. Donoho et al., "IEEE Trans. on Inf. Theory," 1995, Vol. 41, No. 3," pp. 613-627), for example. The identified noise threshold value is represented by Equation (21).

$$t_n(x,y) = \sigma_\phi(x,y)\sqrt{2\log(N)} \quad (21)$$

It should be noted that algorithm which the noise threshold image generation part 325 uses to identify the noise threshold value is not limited to the one mentioned above, and any other known algorithms may be used. The noise threshold image generation part 325 gives the generated noise threshold image to the noise removing part 326.

The noise removing part 326 performs thresholding on the intermediate image using the noise threshold image acquired by the noise threshold image generation part 325. The noise removing part 326 may use a known method for the thresholding. The noise removing part 326 changes pixel values of at least some pixels in the intermediate image by performing thresholding on the intermediate image using a hard thresholding method or a soft thresholding method based on the noise threshold image. In this way, the noise removing part 326 is capable of reducing noise in the intermediate image.

As shown in FIG. 1, if the object to be measured is small compared to an angle of view of the capturing apparatus 2, there may be a case where the image of the object to be measured exists only in a part of the measured image. In this case, a signal for measuring the geometry of the object to be measured in the intermediate image exists only in a part of the intermediate image. Here, a method using the Fourier transform is well-known as noise reduction processing for the measured image or the intermediate image, but the range of frequency analysis in the noise reduction processing using the Fourier transform is the entire image. For this reason, the method using the Fourier transform is not necessarily suitable in the case where the image of the object to be measured exists only in a part of the measured image.

Therefore, the noise removing part 326 may perform thresholding on each pixel of the image acquired by performing a wavelet transform on the intermediate image, using the noise threshold value of corresponding pixels of the image acquired by performing a wavelet transform on the noise threshold image. Any basis can be used as a basis of the wavelet transform. The basis of the wavelet transform may be determined according to an object to be measured or can be freely set by a user. The noise removing part 326 determines a transform level L of the wavelet transform. In a similar manner as the basis of the wavelet transform, the transform level L may be determined according to an object to be measured or can be freely set by a user.

The noise removing part 326 performs a wavelet transform on the intermediate image and the noise threshold image according to the transform level L. The noise removing part 326 performs thresholding on the pixel value of each pixel of the image acquired by performing a wavelet transform on the intermediate image according to the transform level L using the noise threshold value of the pixel that corresponds to the image acquired by performing a wavelet transform on the noise threshold image according to the transform level L. The noise removing part 326 performs thresholding on the image acquired by performing a wavelet transform on the intermediate image, using a soft thresholding method, for example (Equation (22)).

$$\Phi(x, y) = \begin{cases} \text{sign}(\phi'^W(x, y))(|\phi'^W(x, y)| - t_n(x, y)), & t_n(x, y) < |\phi'^W(x, y)| \\ 0, & \text{otherwise} \end{cases} \quad (22)$$

It should be noted that $\Phi'^W$ is a phase value of each pixel in the image acquired by performing a wavelet transform on the intermediate image according to the transform level L, and $\Phi(x, y)$ is a phase value resulting from thresholding being performed on the phase value of the pixel corresponding to the coordinate (x, y). The noise removing part 326 is capable of removing the influence of noise by setting $\Phi(x, y)$ of a pixel whose phase value is less than the noise threshold value to "0."

The noise removing part 326 generates an updated intermediate image by performing an inverse wavelet transform on the image for which noise thresholding was performed. As such, by removing noise with a wavelet transform, the noise removing part 326 is capable of reducing noise localized in the intermediate image. Also, by performing thresholding of a frequency component according to the transform level L, the noise removing part 326 is capable of reducing the noise in the intermediate image. The noise removing part 326 gives the intermediate image, for which a thresholding was performed, to the geometry image generation part 327.

The geometry image generation part 327 generates the geometry image indicating the geometry of the object to be measured using the intermediate image. For example, the geometry image generation part 327 generates the geometry image by applying an arithmetic process, which is determined according to the plurality of conditions, to the updated intermediate image generated by the noise removing part 326 performing thresholding on the intermediate image. Specifically, if identifying the geometry of the object to be measured by using the plurality of measured images which the capturing apparatus 2 generated while the projection patterns having the different phases were projected, the geometry image generation part 327 generates the geometry image by identifying the height of the object to be measured by identifying, using a phase shift method, the position of the projection pattern corresponding to each pixel of the intermediate image for which thresholding was performed.

Figure 6:
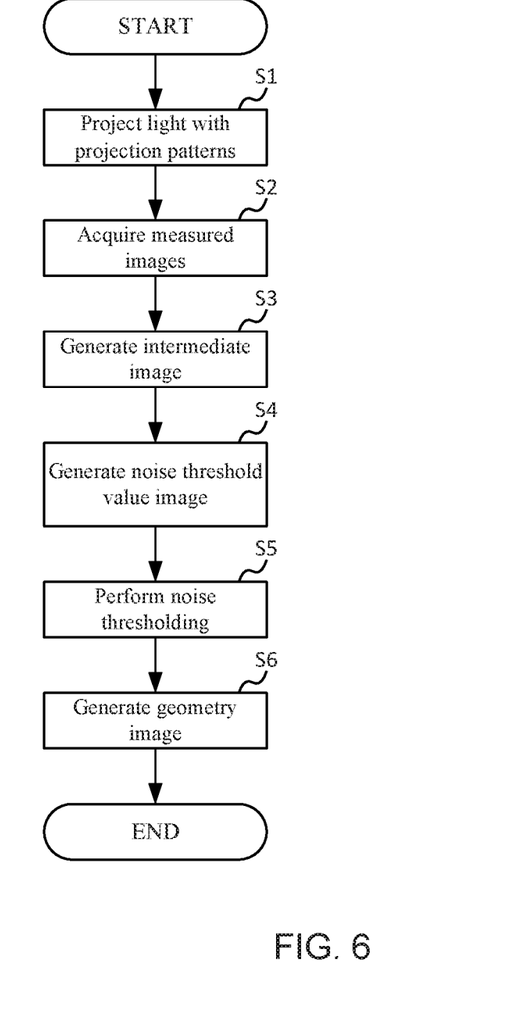
FIG. 6 is a flowchart showing processing for reducing noise performed by the image processing apparatus.

Hereafter, processing for reducing noise performed by the image processing apparatus 3 will be described by referring to FIG. 6. FIG. 6 is a flowchart showing processing for reducing noise performed by the image processing apparatus. First, the apparatus control part 321 projects light with a plurality of projection patterns by controlling the projection apparatus 1 (step S1). The apparatus control part 321 generates the measured images by controlling the capturing apparatus 2 to capture the object to be measured onto which the light with the plurality of projection patterns is projected The image acquisition part 322 acquires the measured images generated by the capturing apparatus 2 (step S2).

Next, the modeling part 323 identifies modeled parameters for the acquired measured images. Subsequently, the intermediate image generation part 324 generates the intermediate image based on the modeled parameters (step S3). Then, the noise threshold image generating part 325 generates the noise threshold image based on the modeled parameters (step S4). It should be noted that the order of steps S3 and S4 may be reversed.

Using the noise threshold image generated by the noise threshold image generating part 325, the noise removing part 326 performs thresholding on the intermediate image which the intermediate image generation part 324 generated (step S5). Then, the geometry image generation part 327 generates the geometry image indicating the geometry of the object to be measured by using the intermediate image on which thresholding was performed (step S6).

Effect of Embodiments

As described above, the modeling part 323 of the image processing apparatus 3 identifies the modeled parameter of each pixel of each of the measured images. The intermediate image generation part 324 generates the intermediate image and the noise threshold image generating part 325 generates a threshold image. The noise removing part 326 performs thresholding on the intermediate image using the noise threshold image. In this way, the noise removing part 326 is capable of reducing noise included in the intermediate image. Also, the geometry image generation part 327 generates the geometry image indicating the geometry of the object to be measured by using the intermediate image on which thresholding was performed. In this way, the geometry image generation part 327 is capable of improving measurement accuracy since the geometry image generation part 327 can generate the geometry image by using the intermediate image in which the noise is reduced.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

(Variation 1)

The explanation of the image processing system S for measuring the geometry of the object to be measured by capturing the object to be measured onto which the projection image is projected has been provided above, but the image processing system is not limited to this. Hereafter, an image processing system S1 using a laser interferometer will be described.

Figure 7:
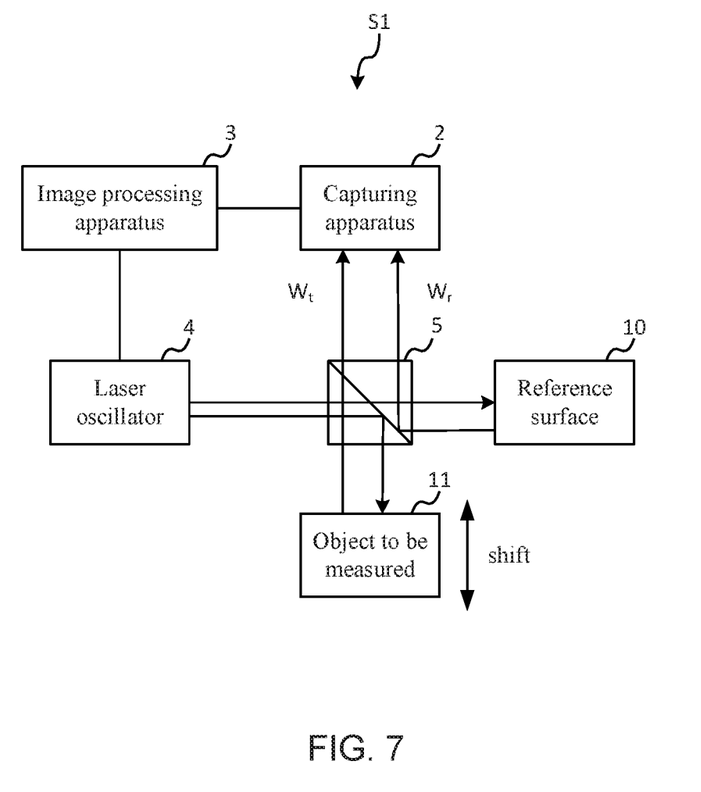
FIG. 7 illustrates the outline of an image processing system according to Variation 1.

The image processing system S1 using laser interference will be described by referring to FIG. 7. FIG. 7 illustrates the outline of the image processing system S1 according to Variation 1. Hereafter, an explanation concerning points of the image processing system S different from the image processing system S1 will be provided, and the explanation of the similar points will be omitted as appropriate. The image processing system S1 is an image processing system for measuring the geometry of the object to be measured by projecting a laser beam with a predetermined wavelength onto a reference surface and the object to be measured and by making the reflected light reflected on the reference surface and the reflected light reflected on the object to be measured interfere with each other.

The image processing system S1 includes the capturing apparatus 2, the image processing apparatus 3, a laser oscillator 4, and a polarized beam splitter 5. The image processing apparatus 3 is connected to the capturing apparatus 2 and to the laser oscillator 4 in a manner enabling communication. The image processing apparatus 3 is capable of moving an object to be measured 11 as appropriate. It should be noted that the image processing apparatus 3 may move a reference surface 10 instead of moving the object to be measured 11.

The laser oscillator 4 is a laser oscillator that emits a laser beam with a predetermined wavelength according to instructions of the image processing apparatus 3. The laser beam which the laser oscillator 4 emitted is polarized and split, in the polarized beam splitter 5, into two laser beams: a laser beam heading to the reference surface 10 and a laser beam heading to the object to be measured 11. The laser beams (reflected lights) reflected on the surfaces of the reference surface 10 and the object to be measured 11 head to the capturing apparatus 2 via the deflection beam splitter 5. In FIG. 7, $W_r$ denotes a laser beam reflected on the surface of the reference surface 10 and $W_t$ denotes a laser beam reflected on the surface of the object to be measured 11.

By referring to FIGS. 8A to 8G, the interference of a laser beam reflected on the reference surface 10 and a laser beam reflected on the surface of the object to be measured 11, and the measurement data acquired by the capturing apparatus 2 will be described. FIGS. 8A to 8G illustrate the interference of two laser beams and measurement data thereof. In FIGS. 8A to 8G, $W_r$ denotes a laser beam reflected on the surface of the reference surface 10 and $W_t$ denotes a laser beam reflected on the surface of the object to be measured 11.

The image processing apparatus 3 controls the capturing apparatus 2 to generate a measured image each time the object to be measured 11 is moved by a travel distance which is determined according to the wavelength of the laser light. That is, the image acquisition part 322 acquires a plurality of measured images captured in a plurality of states where the object to be measured is located at a plurality of different positions. In this way, the image processing apparatus 3 is capable of acquiring the measured image that is an interference image of two laser beams in the states where phase shifts of two laser beams are different.

Figure 8A:
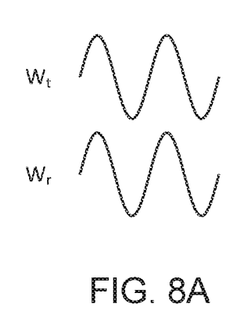
FIGS. 8A to 8G illustrate interference of two laser beams and measurement data.
Figure 8B:
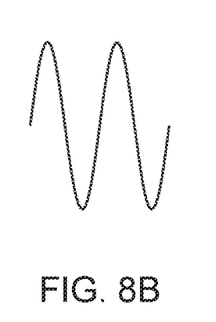
Figure 8C:
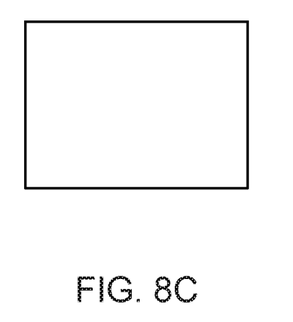

FIG. 8A is a schematic diagram showing the case where the phases of the two laser beams are approximately the same. FIG. 8B is a schematic diagram showing that the amplitudes have increased by strengthening the amplitudes due to interference of the two laser beams. FIG. 8C is a schematic diagram showing the measured image acquired when the phases of two laser beams are approximately the same. As shown in FIG. 8C, the measured image acquired when the phases of two laser beams are approximately the same is a bright image, which is an image in which light intensity is strong in the entire area of the measured image.

Figure 8D:
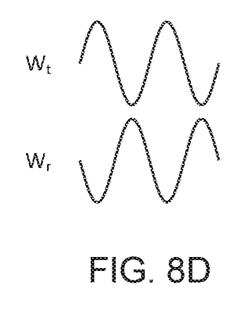
Figure 8E:
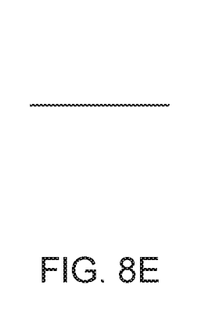

FIG. 8D is a schematic diagram showing the case where the phases of the two laser beams are shifted from each other by approximately π(rad). FIG. 8E is a schematic diagram showing that the amplitudes have decreased by weakening the amplitudes due to interference of the two laser beams.

Figure 8F:
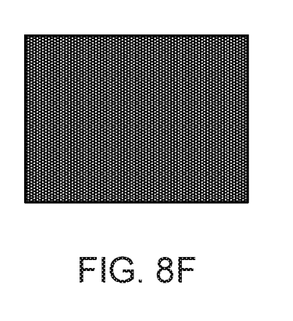

FIG. 8F is a schematic diagram showing the measured image acquired when the phases of the two laser beams are shifted from each other by approximately π(rad). As shown in FIG. 8F, the measured image acquired when the phases of two laser beams are shifted from each other by approximately π(rad) is a dark image, which is an image in which light intensity is weak in the entire area of the measured image.

The measured image in the laser interferometer becomes an image in which light intensity is at approximately the same degree in the entire area of the measured image. If the light intensity of a certain pixel in a measured image differs from the light intensity of another pixel, the height of the measured image in an optical direction of a laser beam at a position corresponding to the certain pixel is different from the height at a position corresponding to the other pixel. The image processing apparatus 3 is capable of identifying the height of the measured image based on light intensity of each pixel.

Figure 8G:
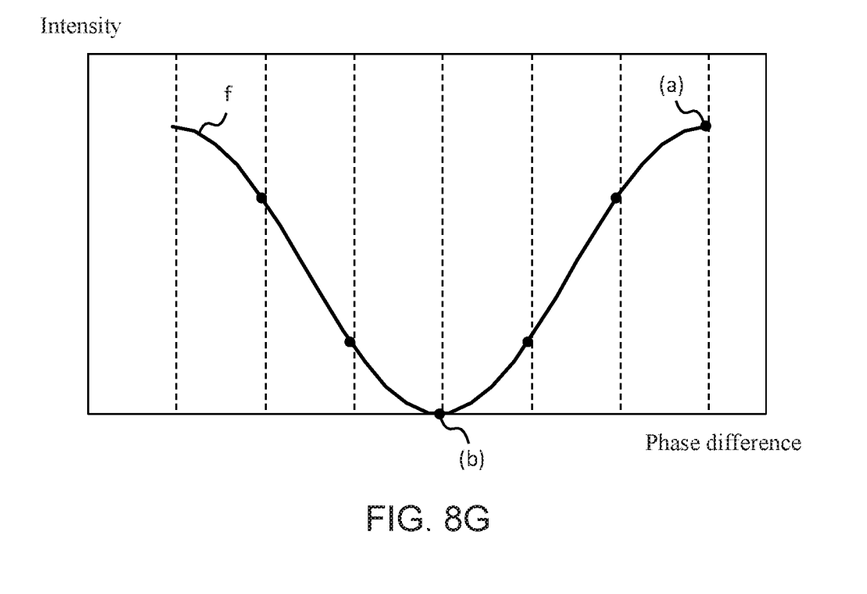

FIG. 8G is a schematic diagram where a data sequence in which the pixel values of the pixels are placed in the order of capturing is plotted. In FIG. 8G, the horizontal axis indicates a phase difference of two laser beams occurring due to the moving of the object to be measured 11, and the vertical axis indicates the pixel value of the pixel associated with light intensity. In FIG. 8G, the pixel value of the pixel corresponds to the intensity of light resulting from the interference of the two laser beams.

The pixel values of the pixels in a measured image are respectively plotted with black circles. For example, the black circle denoted as (a) in FIG. 8G is the measured data of the interference image when the phases of the two laser beams are approximately the same. Also, the black circle denoted as (b) in FIG. 8G is the measured data when the phases of two laser beams are shifted from each other by approximately π(rad). The function f indicated by the solid line is an approximation function approximating the plotted data sequence. The schematic diagram in which the data sequence of the interference image is plotted shown in FIG. 8G is the same as the schematic diagrams in which the data sequence of the measured images are respectively plotted shown in FIG. 4B and FIG. 5.

The image processing apparatus 3 of Variation 1 is capable of reducing noise in the intermediate image by processing the measured images in a similar manner as the above-described image processing apparatus 3. Also, the image processing apparatus 3 is capable of improving accuracy of measuring the geometry of the object to be measured by generating the geometry image using the intermediate image having reduced noise.

(Variation 2)

The image processing system S1 of Variation 1 acquires the plurality of measured images in the state where the phases of two laser beams are shifted from each other by moving the reference surface 10 or the object to be measured 11, but not only this, it may also acquire the measured images that are a plurality of interference images showing interference of laser beams whose phases are different from each other by optically polarizing and splitting a laser beam.

Figure 9:
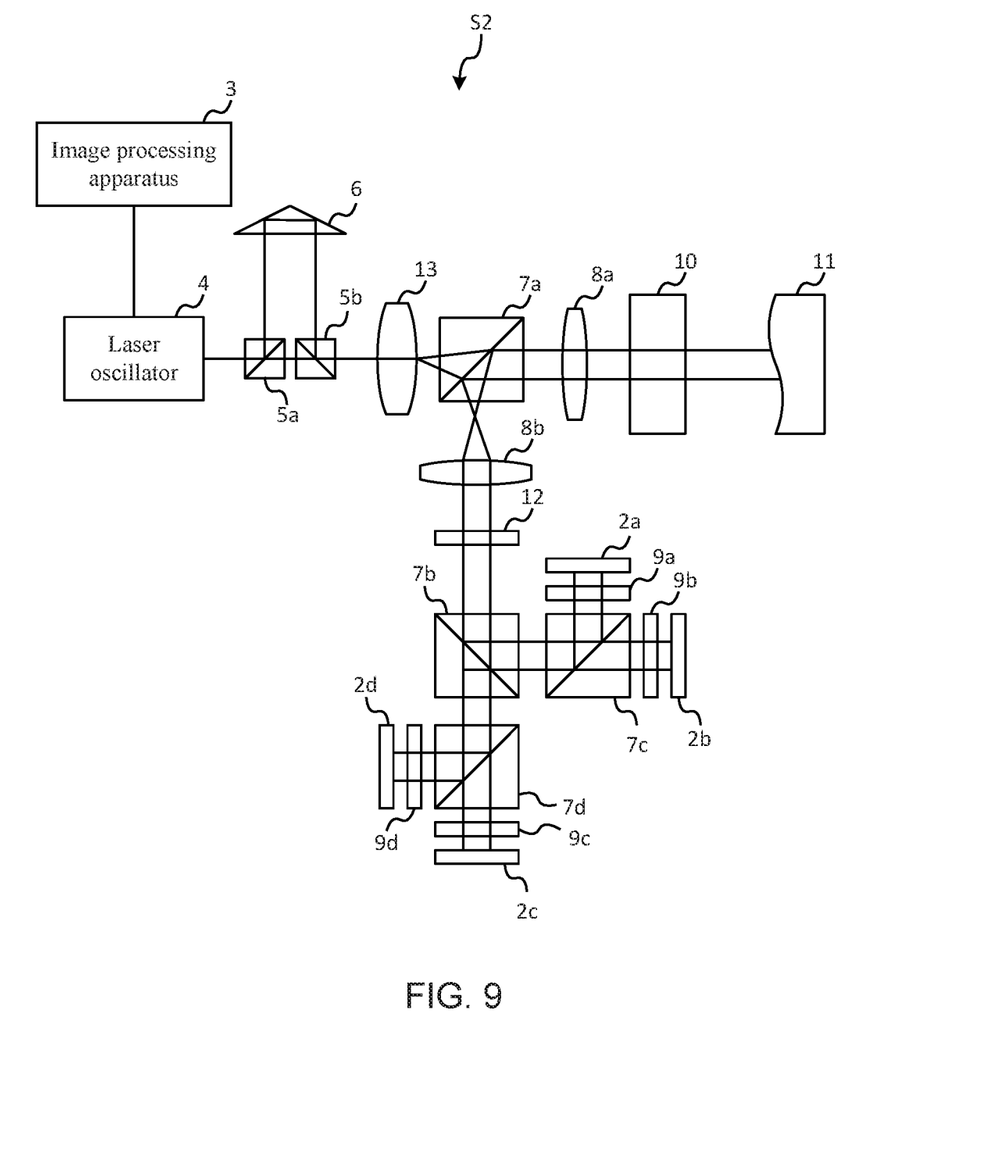
FIG. 9 illustrates a configuration of an image processing system according to Variation 2.

The image processing system S2 using laser interference arising from a polarized phase shift will be described by referring to FIG. 9. FIG. 9 illustrates a configuration of an image processing system S2 according to Variation 2. Hereafter, an explanation concerning points of the image processing system S2 different from the image processing systems S and S1 will be provided, and the explanation of the similar points will be omitted as appropriate. The image processing system S2 is an image processing system for measuring the geometry of the object to be measured by projecting a laser beam with a predetermined wavelength onto the reference surface and the object to be measured and by making the reflected light reflected on the reference surface and the reflected light reflected on the object to be measured interfere with each other.

The image processing system S2 includes a plurality of image capturing apparatuses 2 (2a, 2b, 2c, and 2d), the image processing apparatus 3, the laser oscillator 4, polarized beam splitters 5a and 5b, a corner cube reflector 6, a plurality of beam splitters 7 (7a, 7b, 7c, and 7d), collimator lenses 8a and 8b, a plurality of polarizing plates 9 (9a, 9b, 9c, and 9d), a ¼ wave plate 12, and a magnifying lens 13. The image processing apparatus 3 is connected to the plurality of image capturing apparatuses 2 and to the laser oscillator 4 in a manner enabling communication. It should be noted that the plurality of image capturing apparatuses 2 may be imaging elements, and the image processing apparatus 3 may include a plurality of imaging elements.

A laser beam emitted by the laser oscillator 4 is polarized and split in the polarized beam splitter 5a. One of laser beams polarized and split in the polarized beam splitter 5a travels straight and reaches the polarized beam splitter 5b, and the other laser beams reaches the polarized beam splitter 5b through the corner cube reflector 6. The laser beam which passed through the polarized beam splitter 5b reaches the ¼ wave plate 12 passing through the various optical systems mentioned above.

The laser beam that passed through the ¼ wave plate 12 is split in each of the plurality of beam splitters 7. The split laser beams reach the capturing apparatus 2 through the polarizing plate 9. The image processing system S2 is configured so that the laser beam reflected on the reference surface 10 and the laser beam reflected on the object to be measured 11 interfere in the capturing apparatus 2. Specifically, the plurality of polarizing plates 9 are provided so that two laser beams interfere at different phases in the capturing apparatus 2. The image processing apparatus 3 generates a measured image that is an interference image of two laser beams by respectively controlling the plurality of capturing apparatuses 2.

By this, the image processing apparatus 3 in the image processing system S2 is capable of acquiring the measured images that are the plurality of interference images in the state where the phase shifts of the two laser beams are different from each other. The image processing apparatus 3 of Variation 2 is capable of reducing noise in the intermediate image by processing the measured images in a similar manner as the above-described image processing apparatus 3. Also, the image processing apparatus 3 is capable of improving the accuracy of measuring the geometry of the object to be measured by generating the geometry image which indicates the geometry using the intermediate image having reduced noise.

What is claimed is:

1. An image processing apparatus, comprising:
   an image acquisition part that acquires a plurality of measured images by capturing an object to be measured;
   a modeling part that identifies, for each pixel of the measured images, a modeled parameter of an approximation function approximating a data sequence where pixel values of pixels corresponding to the measured images are placed according to a predetermined order;
   an intermediate image generation part that generates an intermediate image for generating a geometry image indicating a geometry of the object to be measured based on the modeled parameter;

a noise threshold image generation part that generates a noise threshold image by identifying a noise threshold value of each pixel in the intermediate image using statistics indicating an error between the pixel values of pixels included in the data sequence and approximation values of pixels identified based on the modeled parameter for each pixel; and a noise removing part that performs thresholding on the intermediate image using the noise threshold image, wherein the noise removing part generates an updated intermediate image by performing an inverse wavelet transform on an image that is acquired by performing thresholding on each pixel in an image acquired by performing a wavelet transform on the intermediate image, using the noise threshold value of a corresponding pixel in an image acquired by performing a wavelet transform on the noise threshold image.

2. The image processing apparatus according to claim 1, further comprising a geometry image generation part that generates the geometry image by performing arithmetic processing that is determined according to a plurality of conditions on an updated intermediate image generated by the noise removing part performing thresholding on the intermediate image.

3. The image processing apparatus according to claim 1, wherein the plurality of measured images are images of light with the plurality of projection patterns having different phases projected onto the object to be measured, wherein the intermediate image generation part generates an intermediate image encoded so that geometry information of the object to be measured corresponds to the phases of the projection patterns determined according to conditions comprising a type of projection patterns projected onto the object to be measured, an order of capturing the object to be measured onto which the projection patterns are projected, or a wavelength of light to be projected, and the noise threshold image generation part generates the noise threshold image using a phase error determined by laws of propagation of errors based on statistics.

4. The image processing apparatus according to claim 1, wherein the noise threshold image generation part generates the noise threshold image using a standard deviation which is a difference between the pixel values of the plurality of pixels included in the data sequence and the approximation value of each pixel.

5. The image processing apparatus according to claim 1, wherein the image acquisition part acquires the plurality of measured images obtained by capturing the object to be measured in a plurality of states where light of a plurality of projection patterns having different phases are projected onto the object to be measured.

6. The image processing apparatus according to claim 1, wherein the image acquisition part acquires the plurality of measured images that are captured in a state where a laser beam reflected on a surface of a reference surface and a laser beam reflected on a surface of the object to be measured are incident on a capturing apparatus.

7. The image processing apparatus according to claim 6, wherein the image acquisition part acquires the plurality of measured images that are captured in a plurality of states where the object to be measured is located at a plurality of different positions.

8. A non-transitory storage medium storing a program for making a computer perform functions of:

acquiring a plurality of measured images by capturing an object to be measured;

identifying, for each pixel of the measured images, a modeled parameter of an approximation function approximating a data sequence where pixel values of pixels corresponding to the measured images are placed according to a predetermined order;

generating an intermediate image for generating a geometry image indicating a geometry of the object to be measured based on the modeled parameter;

generating a noise threshold image by identifying a noise threshold value of each pixel in the intermediate image using statistics indicating an error between the pixel values of pixels included in the data sequence and approximation values of pixels identified based on the modeled parameter for each pixel; and performing with a noise removing part thresholding on the intermediate image using the noise threshold image, wherein the noise removing part generates an updated intermediate image by performing an inverse wavelet transform on an image that is acquired by performing thresholding on each pixel in an image acquired by performing a wavelet transform on the intermediate image, using the noise threshold value of a corresponding pixel in an image acquired by performing a wavelet transform on the noise threshold image.

* * * * *